United States Patent [19]

Mattick et al.

[11] 4,205,092

[45] May 27, 1980

[54] ACID REDUCTION IN WINE BY ION EXCHANGE

[75] Inventors: Leonard R. Mattick, Geneva, N.Y.; Edward V. Gogel, Downers Grove, Ill.

[73] Assignee: Cornell Research Foundation, Inc., Ithaca, N.Y.

[21] Appl. No.: 931,223

[22] Filed: Aug. 4, 1978

[51] Int. Cl.$^2$ .............................................. C12H 1/04
[52] U.S. Cl. .................................. 426/271; 210/37 R; 210/38 R; 426/592
[58] Field of Search ................ 426/15, 271, 592, 599; 210/37 R, 38 R, 74; 521/34, 25

[56] References Cited

U.S. PATENT DOCUMENTS

| | | | |
|---|---|---|---|
| 2,469,684 | 5/1949 | Dudley | 521/34 X |
| 2,667,417 | 1/1954 | Delmousee et al. | 426/271 |
| 2,682,468 | 6/1954 | Frampton | 426/271 |
| 2,754,212 | 7/1956 | Wiseman | 426/271 |
| 3,437,491 | 4/1969 | Peterson et al. | 426/271 |

FOREIGN PATENT DOCUMENTS 528402  7/1956  Canada ..................................... 426/271

*Primary Examiner*—Arthur L. Corbin
*Attorney, Agent, or Firm*—Jones, Tullar & Cooper

[57] ABSTRACT

A method of treating wines is disclosed which reduces total acidity without a significant change in pH, increases tartrate stability, and improves palatability. A portion of the wine is passed through a two step ion exchange system which employs a cation exchange column in the H$^+$ form followed by an anion exchange column having a nonporous, amine type resin in the free base form, and the treated wine is then blended with untreated wine.

4 Claims, 4 Drawing Figures

TARTRATE: EFFECT OF pH ON PERCENTAGE OF ACID, ACID SALT, AND SALT.

MALATE: EFFECT OF pH ON PERCENTAGE OF ACID, ACID SALT, AND SALT.

ACID REDUCTION IN WINE BY ION EXCHANGE

BACKGROUND OF THE INVENTION

One of the major problems facing the wineries in the Northeastern United States is the high-acid wines. The climatic conditions as well as the short growing season results in a high total acidity. It is not uncommon for a wine to have a total acidity of 1.2%. Malic acid is the major contributor to this problem. The high malic concentration as well as the lower pH can result in a very high malic acid content in the wines, since 55% to 70% of the total malate is present in the acid form. The other major wine acid, tartaric, does not pose a problem in the acidity of the wine, since its concentration is drastically reduced during the fermentation due to the deposition of potassium bitartrate.

There have been many attempts to lower the acidity of the Eastern wines using physical, biological, and chemical methods:
A. Physical Methods:
1. Amelioration with water to dilute the acidity.
2. Blending with low-acid wines.
3. Covering the acid taste with the addition of sugar.
B. Biological Methods:
1. Malo-lactic fermentation.
2. Double fermentation with *Schizosaccharomyces pombe* followed by *Saccharomyces cerevisiae*.
C. Chemical Methods:
1. Double salt precipitation
2. Neutralization with $K_2CO_3$
3. Neutralization and precipitation with $CaCO_3$.

All three methods have considerable disadvantages since in many cases the end results may give rise to other problems. By using the physical methods outlined the acid is diluted to reduce acidity in the case of amelioration or blending with low-acid wines while the acid flavor is masked in the case of the addition of sugar. As to the biological methods, results are not always predictable. Ideal conditions have to exist for the malo-lactic fermentation. pH values of these wines are usually between 3.1 to 3.3. This would mean that between 13 and 19 parts per million free $SO_2$ in the wine would retard the growth of the malo-lactic organism. The *Schizosaccharomyces pombe* would impart an off-flavor to the wine. Employing a chemical method involves the addition of various chemicals which can cause stability as well as flavor problems for the product. In the case of the $CaCO_3$ and the double salt methods a stability problem will result since the calcium concentration is increased, whereas with the use of potassium carbonate, a stability problem as well as a flavor problem can result if the acidity is reduced to any great extent. A maximum reduction between 0.15% to 0.2% total acid, calculated as tartaric acid, can be done with the potassium carbonate without any adverse flavor effects; much over this amount, a metallic character will result in the wine.

Ion exchange has been used in the wine industry for many years. Stabilization of wines using a cation exchange to replace the potassium in wine with sodium has been used by the industry throughout the world. Further, it has been employed in the case of low-acid wines to increase the acidity of the wine by using a cation exchange of the potassium with hydrogen ion. The thought that the acidity of wines could be reduced without the addition of any substance using ion exchange could be an ideal method of reducing the acidity. The initial thought was to employ an anion exchange to remove the acids; it was observed that strongly basic anion exchange resins, which are primarily quaternary ammonium type structures, imparted a "fish-like" flavor to the wines probably due to the liberation of trimethylamine. The anion exchange using the weakly basic resin in the salt form caused a "soap-like" or salty character to the wine.

It is also known in the art that total acidity and particularily volatile acidity in substandard wines (greater than 0.14 grams per 100 ml calculated as acetic acid) can be reduced by the use of a cation exchange column followed by an anion exchange employing a porous resin (see U.S. Pat. No. 2,682,468).

It is also known in the art that flavor, aroma and color of fortified wines can be improved by first passage through a porous anion exchange resin in the hydroxyl form followed by a porous cation exchange resin employed in the $H^{30}$ form, however, this form of treatment results in a significant decrease in pH and in many cases increases total acidity (see U.S. Pat. No. 3,437,491).

SUMMARY OF THE INVENTION

In accordance with the principles of this invention, wine is first subjected to a cation resin in the $H^{30}$ form followed by a non-porous weakly basic anion resin in the free base form, the treated wine then being blended with untreated wine.

An object of the invention is to treat wine in a way so as to improve its palatability, decrease total acidity, without significant effect on pH, and increase tartrate stability.

DESCRIPTION OF PREFERRED EMBODIMENT

Figure 2:
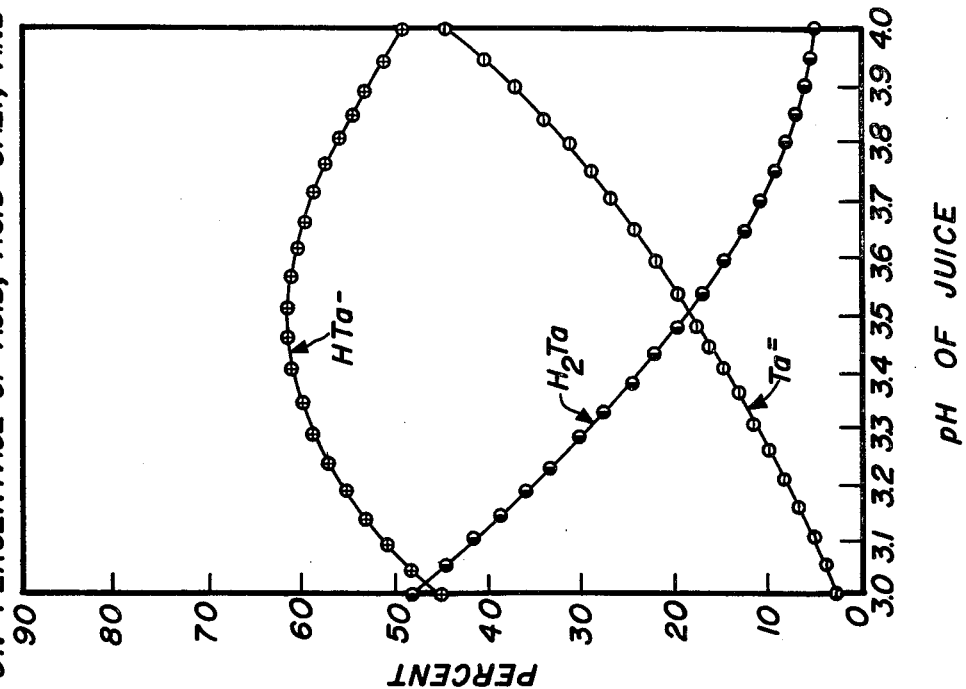
FIG. 2 is a family of curves showing the relationship of pH and tartrate.
Figure 1:
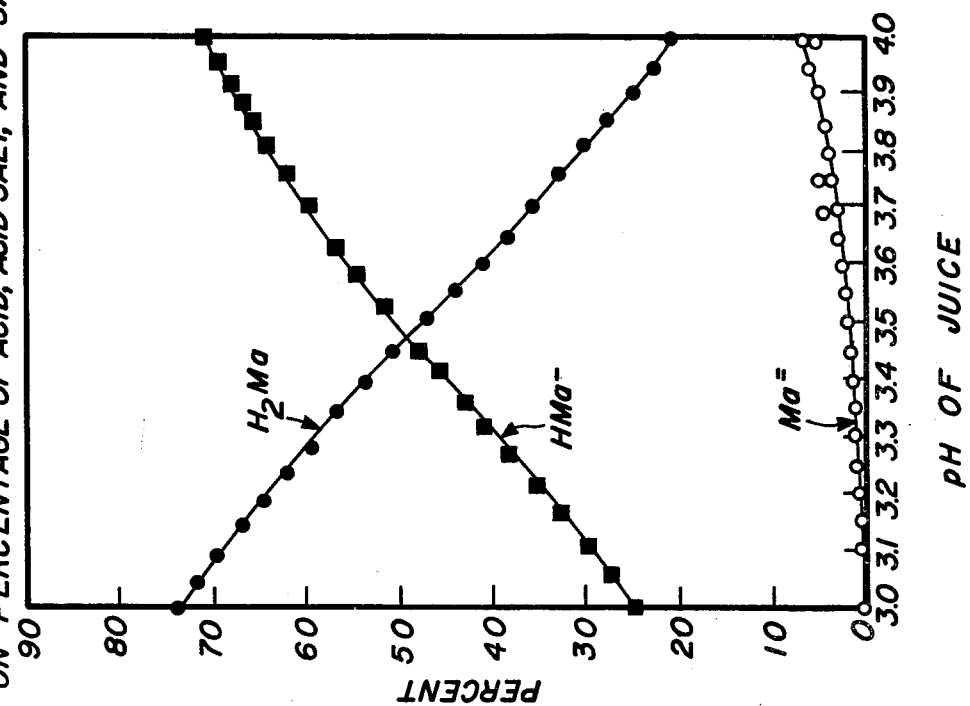
FIG. 1 is a family of curves showing the relationship of pH and malate.

It can be shown that the malate contributes more to the acidity of the wine than the tartrate (FIGS. 1 and 2). Both malate and tartrate can exist in equilibrated forms of the acid, acid salt, and salt, and the concentration is dependent upon pH. It can be seen in FIG. 1 at a pH 3.3; the malate acid would be approximately 55% while FIG. 2 shows that tartrate at the same pH would be approximately 27%. Further, the tartrate poses a problem only with tartrate stabilization, since the concentration of tartrate is reduced drastically during the fermentation process.

In accordance with this invention a system is provided which consists of two separate ion exchange columns, a cation and an anion unit. The anion column has to be four to six times larger than the cation so that in processing, both columns would be exhausted at approximately the same time. The cation employed was Duolite C-25D in the H+ form 1 and the anion was Duolite A-7D a weakly basic nonporous resin in the free base form 2, an epoxyamine-type compound.

[1] Duolite C-25D is a highly porous strong-acid cation exchange resin which is a sulfonated copolymer of styrene and divinylbenzene (5.5%), in bead form, with a specific gravity of 1.30 (Na form), a void volume of 40%, a moist particle size of 16–50 mesh (U.S. Standard Sieve), and a total ion-exchange capacity of 1.7 meq/ml.
[2]Duolite A-7D is a low porosity weak-base anion-exchange resin which is a cross-linked phenolformaldehyde resin wherein the principle functional groups are secondary amine groups, in granular form.

The cation exchange resin is prepared for use as follows: (1) two bed volumes of 5% mineral acid is passed through the column then rinsed with 5 bed volumes of deionized or low solids water. (2) Two bed volumes of 5% sodium hydroxide is passed through the column, an up flow is used to prevent packing, then this is rinsed with 5 bed volumes of the deionized or low solids water. (3) This cycle is repeated three times. (4) Finally, two bed volumes of 5% mineral acid is passed through the column and rinsed with five bed volumes of the ion exchange water or until the pH of the effluent is between 2 and 3. (5) The cation exchange column is ready for use.

The anion exchange resin is prepared for use as follows: (1) Two bed volumes of 5% sodium hydroxide is passed through the column then rinsed with 5 bed volumes of the deionized or low solids water. (2) Two bed volumes of 5% mineral acid is passed through the column then rinsed with 5 bed volumes of the ion exchanged water. (3) Cycle is repeated three times. (4) Finally, two bed volumes of sodium hydroxide is passed through the column and rinsed with 5 bed volumes of ion exchanged water or until the pH of the effluent is below the pH of 9.

The size of the columns would depend upon the desired volume required for production, but based on our investigation, 500 gallons of wine can be processed through one cubic foot of cation resin before exhausting and approximately 100 gallons of wine can be processed through one cubic foot of anion resin before exhausting. Basically, these gallonages depend on the chemical composition of the wine prior to treatment. The resins can be stored using a 20% wine without any chemical or biological change occurring in the resins.

In all the cases studied, the resulting wines had a lower acidity. Upon taste evaluations by a group of analysts who are familiar with these types of wines, it was determined that this processing improved the taste characteristics substantially. The amount of wine which can be ion exchanged parallels that of the amount which could be exchanged in the normal tartrate stabilization. It is our opinion that up to 50% of the wine could be exchanged. Over 50% results in a loss of some of the wine character, which is proportional to the amount which is ion exchanged over 50%.

Figure 4:
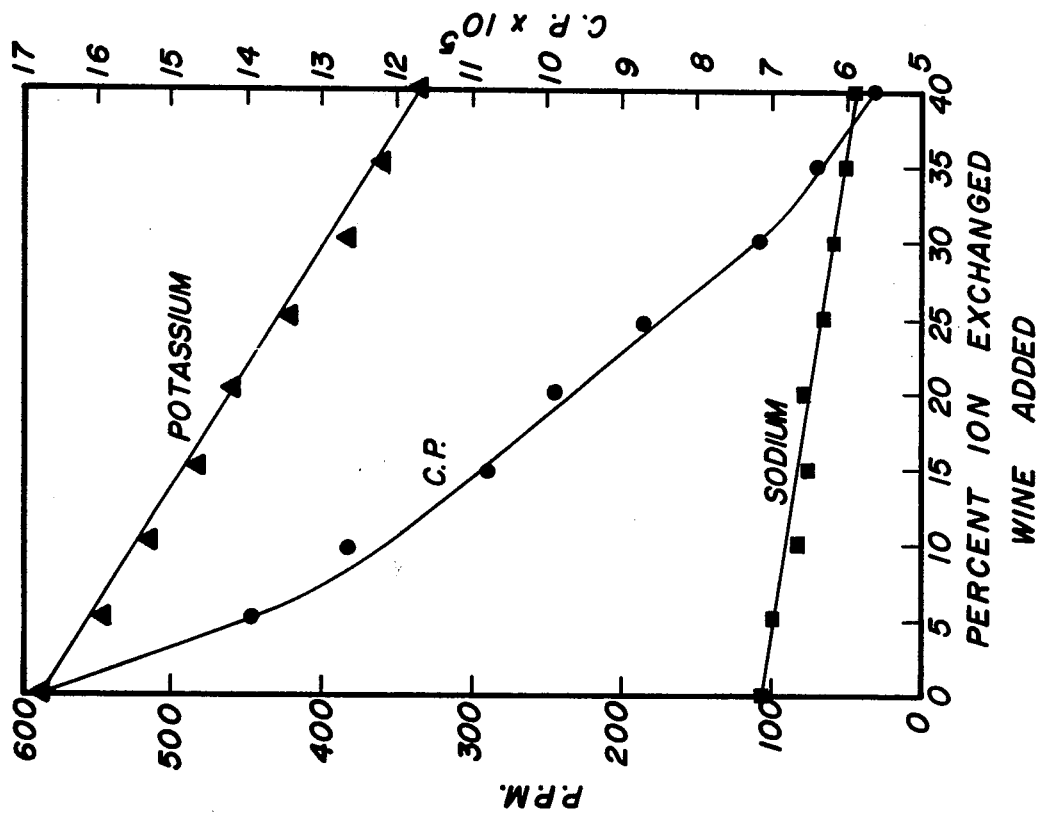
FIG. 4 is a family of curves showing potassium, sodium and concentration product as a function of percent ion exchanged wine added.
Figure 3:
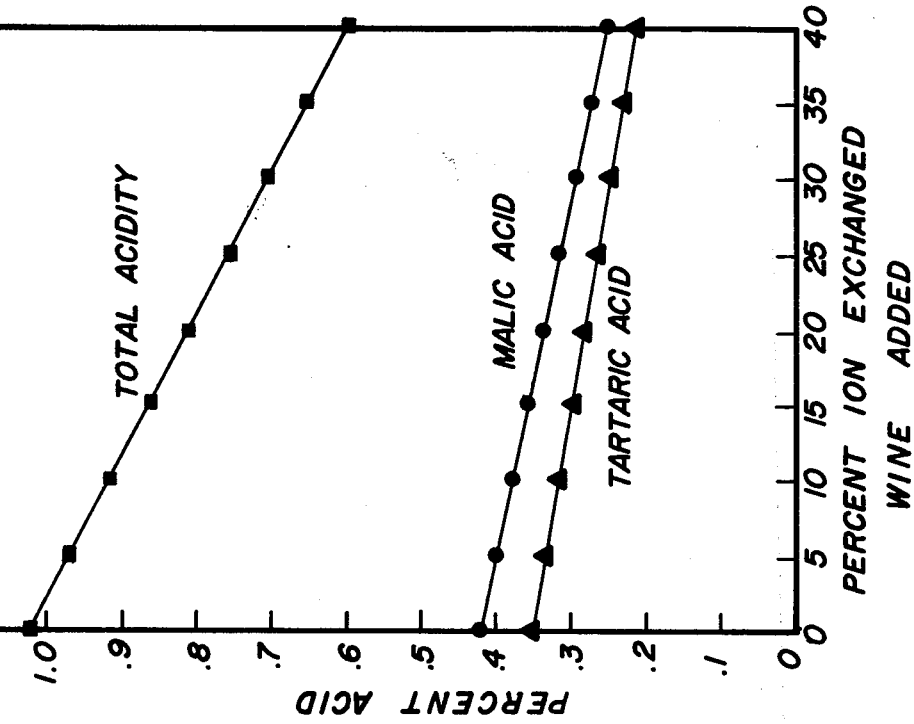
FIG. 3 is a family of curves showing total acidity, malic acid and tartaric acid as a function of percent ion exchanged wine added.

In order to check the linearity of the acid reduction a wine with a total acid of 1.02 was exchanged using the cation-anion process, then added back to untreated wines in amounts from 0% to 40% at 5% intervals. The blended wines were analyzed for total acid, total acidity, malic and tartaric acid, potassium, sodium, and the concentration product was then calculated from the pH and total tartrate and potassium. (See FIG. 3 and FIG. 4). The total acid drop was a linear function; malic tartaric acid dropped accordingly, also linear. The drop in potassium and sodium was also linear. The concentration product decreased, curve linear.

Our experience with the process has indicated that a winery is able to control the acid content of the wines by a simple method without the addition of foreign components to its product.

EXAMPLE 1

A white wine with a total acidity of 1.24 was calculated for a reduction in acid to 0.80. This indicated that 35% of the wine was to be exchanged. Initially, it was passed through the cation exchange resin, a sample was taken for analysis, then passed through the anion exchange resin.

68 ml of the ion exchanged wine was added to a 200 ml graduate cylinder and made to volume with the original wine.

The flavor of (C) was void of acidic taste although the volatile flavor of the wine appeared unchanged.

The pH of the wine did not change since the ratio of malic to tartaric acids was constant which meant the buffering effect of these acids remained the same. (See Table 1).

Reduction in tartrate and potassium gave rise to a lower C.P. which would increase the tartrate stability. (See Table 2).

(C.P. being concentration product; see Berg, H. W. and Keefer, R. M., Am. J. Enology and Vitculture, 9, 180–193 [1958]).

Sodium remained relatively unchanged.

Table 1

| WHITE WINE-INITIAL STUDY | | | |
|---|---|---|---|
| | | Total Acidity | |
| Sample | pH | Observed | Calculated |
| (A) Original Wine | 2.85 | 1.24 | — |
| (B) Cation exchanged (100%) | 2.26 | 1.38 | — |
| (C) Cation exchanged (B) passed through Anion exchange (100%) | 3.09 | 0.03 | — |
| (D) 34% C + 66% A | 2.84 | 0.80 | 0.81 |
| (E) 40% C + 60% A | 2.84 | 0.74 | 0.74 |
| (F) 50% C + 50% A | 2.84 | 0.61 | 0.62 |

Table 2

| WHITE WINE-INITIAL STUDY | | | | |
|---|---|---|---|---|
| Sample | Tartrate G/100 ml | Potassium (ppm) | Sodium (ppm) | C.P. × $10^{-5}$ |
| (A) Original Wine | 0.30 | 590 | 37 | 12.0 |
| (B) Cation exchanged (100%) | 0.31 | 20 | 19 | — |
| (C) Cation exchanged (B) passed through anion exchange | 0.00 | 30 | 14 | — |
| (D) 34% (C) + 66% (A) | 0.20 | 400 | 35 | 5.4 |
| (E) 40% (C) + 60% (A) | 0.18 | 350 | 34 | 4.2 |
| (F) 50% (C) + 50% (A) | 0.14 | 290 | 42 | 2.7 |

EXAMPLE 2

A white wine with a total acidity of 1.24 was treated to reduce the total acid to 0.70. Calculations indicated that 44% of the wine was to be ion exchanged. This amount was treated as described and blended with original wine in the ratio of 44:56. The chemical analysis of this wine is shown in Table 3.

Table 3

| | pH | Total Acidity % | | Tartrate g/100 ml | Potassium (ppm) | Sodium (ppm) |
|---|---|---|---|---|---|---|
| | | Observed | Calculated | | | |
| original wine | 2.85 | 1.24 | — | 0.30 | 590 | 37 |
| treated wine | 2.84 | 0.71 | 0.70 | 0.17 | 340 | 20 |

EXAMPLE 3

A pink wine (Catawba) with a total acidity of 1.09 was treated to adjust the total acid to 0.70. Calculation indicated that 36% of the wine was to be ion exchanged and blended into the original wine in the ratio of 36:64. Analysis of the wine is shown in Table 4.

Table 4

|  | pH | Total Acidity (%) Observed | Total Acidity (%) Calculated | Tartrate g/100 ml | Potassium (ppm) | Sodium (ppm) |
|---|---|---|---|---|---|---|
| Original wine | 2.93 | 1.09 | — | 0.35 | 730 | 61 |
| Treated wine | 2.94 | 0.72 | 0.70 | 0.22 | 470 | 45 |

EXAMPLE 4

A pink wine (Catawba) with a total acidity of 1.09 was ion exchanged and blended with 73% untreated wine. Analysis of the wine is shown in tables 5 and 6.

Table 5

| Sample | pH | Total Acidity (%) Observed | Total Acidity (%) Calculated |
|---|---|---|---|
| (A) Original Wine | 2.93 | 1.09 | — |
| (B) Cation exchanged (100%) | 2.17 | 1.25 | — |
| (C) Anion exchanged (100%) | 8.10 | 0.01 | — |
| (D) (B) passed through anion exchange | 3.71 | 0.02 | — |
| (E) 27% C + 73% A | 3.20 | 0.71 | 0.71 |
| (F) 27% D + 73% A | 2.94 | 0.72 | 0.71 |

Table 6

| Sample | Tartrate g/100 ml | Potassium (ppm) | Sodium (ppm) | C.P. × $10^{-5}$ |
|---|---|---|---|---|
| (A) Original Wine | 0.35 | 730 | 61 | 19.5 |
| (B) Cation exchanged (100%) | 0.34 | 5.0 | 16 | — |
| (C) Anion exchanged (100%) | 0.0 | 0.0 | 15 | — |
| (D) (B) passed through anion exchange | 0.0 | 0.0 | 19 | — |
| (E) 27% (C) + 73% (A) | 0.240 | 720 | 54 | 15.8 |
| (F) 27% (D) + 73% (A) | 0.240 | 480 | 44 | 8.6 |

EXAMPLE 5

A red wine having a total acidity of 0.93 was treated to reduce the total acid to 0.70. Calculations indicated that 25% of the wine was to be ion exchanged and blended with the original wine in the ratio of 25:75. Analysis appears in Table 7.

Table 7

|  | pH | Total Acidity (%) Observed | Total Acidity (%) Calculated | Tartrate g/100 ml | Potassium (ppm) | Sodium (ppm) | Absorbance at* 520 nm | Absorbance at* 420 nm | 420/520* ratio |
|---|---|---|---|---|---|---|---|---|---|
| Original wine | 3.10 | 0.93 | — | 0.37 | 1050 | 63 | 10.5 | 5.85 | 0.56 |
| Treated wine | 3.09 | 0.70 | 0.70 | 0.28 | 790 | 52 | 7.88 | 4.18 | 0.53 |

*Decrease in the absorbance at 520 nm indicates a proportionate loss in color. The 420/520 ratio indicates that the brown as well as anthocyanins were removed.

EXAMPLE 6

A red wine with a total acidity of 2.22 was ion exchanged and blended with 31% of untreated wine. Analysis appears in Tables 8 and 9.

Table 8

| Sample | pH | Total Acidity (%) Observed | Total Acidity (%) Calculated |
|---|---|---|---|
| (A) Original wine | 2.89 | 2.22 | — |
| (B) Cation exchanged (100%) | 2.06 | 2.34 | — |
| (C) Anion exchanged (100%) | 7.25 | 0.01 | — |
| (D) (B) passed through anion exchange | 3.65 | 0.05 | — |
| (E) 69% (C) + 31% (A) | 3.51 | 0.69 | 0.69 |
| (F) 69% (D) + 31% (A) | 2.96 | 0.70 | 0.69 |

Table 9

| | Sample | Tartrate g/100 ml | Potassium (ppm) | Sodium (ppm) | C.P. × $10^{-5}$ | Absorbance at 520 nm | Absorbance at 420 nm | 420/520 |
|---|---|---|---|---|---|---|---|---|
| (A) | Original Wine | 0.30 | 1140 | 16 | 24.5 | 5.35 | 2.91 | 0.54 |
| (B) | Cation exchanged (100%) | 0.31 | 40 | 8 | — | 1.21 | 1.15 | 0.95 |
| (C) | Anion exchanged (100%) | 0.03 | 1120 | 25 | — | 0.85 | 0.79 | 0.93 |
| (D) | (B) passed through anion exchange | 0.03 | 25 | 30 | — | 0.55 | 0.49 | 0.89 |
| (E) | 69% (C) + 31% (A) | 0.09 | 980 | 24 | 9.4 | 2.17 | 1.44 | 0.66 |
| (F) | 69% (D) + 31% (A) | 0.09 | 330 | 16 | 2.3 | 2.01 | 1.26 | 0.63 |

What is claimed is:

1. A method of treating wines having an undesirably high total acidity contributed by a high malic acid concentration, without significantly affecting pH, which comprises:
   (a) passing the wine through a cation exchange resin in the H+ form;
   (b) subsequently passing said wine through a weakly basic, nonporous, amine type anion exchange resin in the free base form, thereby lowering the malic acid content of said wine, while maintaining the ratio of malic acid to tartaric acid constant;
   (c) blending a volume of the ion exchanged wine with a volume of untreated wine in a manner such that the volume of ion exchanged wine is less than or equal to the volume of untreated wine.

2. A method as in claim 1 wherein the volume of the anion exchange resin is four to six times the volume of the cation exchange resin.

3. A method as in claim 1 wherein the wine is a Catawba wine.

4. A method as in claim 1 wherein the anion resin is an epoxyamine-type resin.

* * * * *

UNITED STATES PATENT AND TRADEMARK OFFICE
CERTIFICATE OF CORRECTION

PATENT NO. : 4,205,092
DATED : May 27, 1980
INVENTOR(S) : Leonard R. Mattick and Edward V. Gogel It is certified that error appears in the above-identified patent and that said Letters Patent are hereby corrected as shown below:

In column 2, line 18, change "$H^{30}$" to read --$H+$--;

In column 2, line 24, change "$H^{30}$" to read --$H+$--.

Signed and Sealed this

Twelfth Day of August 1980

[SEAL]

Attest:

SIDNEY A. DIAMOND

Attesting Officer

Commissioner of Patents and Trademarks